United States Patent Office 3,535,121
Patented Oct. 20, 1970

3,535,121
PRODUCTION OF CREAM CHEESE FLAVOR
Anthony J. Luksas, Chicago, Ill., assignor to Beatrice Foods Co., Chicago, Ill., a corporation of Delaware
No Drawing. Filed Oct. 9, 1967, Ser. No. 673,945
Int. Cl. A23c *19/02*
U.S. Cl. 99—116                                 11 Claims

ABSTRACT OF THE DISCLOSURE

Fermented flavor-cream cheese type is produced by growing a mixture of *Streptococcus lactis* and *Streptococcus diacetilactis* on milk, most preferably skim milk, under aerobic conditions. Maximum flavor is produced at 20–45° C., preferably 32° C., in 2–5 days in the presence of citric acid.

---

The present invention relates to the preparation of fermented flavor-cream cheese type.

*Streptococcus diacetilactis*, when grown on milk, e.g. whole or skim milk, does not produce a significant fermented flavor-cream cheese type. Lactic acid producing organisms also do not produce "cream cheese type flavor" when grown on such a medium.

It is an object of the present invention to prepare "cream cheese type flavoring."

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by browing a mixture of *Streptococcus diacetilactis* and a lactic acid producing organism, preferably *Streptococcus lactis*, on a medium comprising lactose and a protein source in the presence of citric acid or a citrate, e.g. sodium citrate. Desirably citrate, in addition to that present in milk, is added in an amount of 0.01 to 0.5%.

The preferred source of lactose and protein is skim milk. However, there can also be used condensed milk, fluid whey, reconstituted whey or whole milk.

In place of *Streptococcus lactis* less preferably there can be employed other lactic acid forming bacteria such as *Lactobacillus lactis, Lactobacillus helveticus, Streptococcus cremoris* and *Streptococcus thermophilus.*

It is critical that the organisms be grown under aerobic conditions since if anaerobic conditions are employed there is not obtained the desired "cream cheese type flavor."

To insure aerobic conditions the fermentation is carried out with agitation while introducing air. The fermentation can be carried out for 1–10 days. Maximum "cream cheese type flavor" is obtained in 2–5 days. The organisms are grown at 20–45° C., preferably 32° C.

The product obtained can be used as such but preferably it is dried, e.g. by spraying drying, roller drying, freeze drying, thin film drying to preserve the product. The resulting powder has a strong pleasant "cream cheese type flavor" and can be used to impart a "cream cheese type flavor" to a dip, cream cheese, butter or oleomargarine.

The use of skim milk is preferable to the use of whole milk since the product obtained when skim milk is employed as the growth medium has a longer shelf life.

After the cultures have grown to develop the maximum amount of "cream cheese type flavor" the bacteria are killed by pasteurization unsing conventional pasteurization temperatures and times, e.g. 140° F. for 30 minutes, 160° F. for 15 minutes, 180° F. for 15 seconds.

Unless otherwise indicated all parts and percentages are by weight.

EXAMPLE 1

Skim milk containing 0.1% added sodium citrate was inoculation with *Streptococcus lactis* and *Streptococcus diacetilactis* and agitated constantly for 3 days at 32° C. While passing air through the milk. The product was then heated at 175° F. for 20 minutes pasteurization to kill the organisms and then chilled to 40° F. The product thus obtained had a strong "cream cheese flavor" and was suitable for use as is.

EXAMPLE 2

The procedure of Example 1 was repeated but the product after being pasteurized was spray dried to give a powder having a long shelf life and a strong pleasant "cream cheese flavor."

EXAMPLE 3

The procedure of Example 2 was repeated but there was employed whole milk. The powder obtained after spray drying had a strong "cream cheese flavor" but did not have as long a shelf life as the product of Example 2.

I claim:
1. A process for producing a strong "cream cheese flavor" comprising growing a mixture of organisms consisting essentially of a Streptococcus or Lactobacillus lactic acid producing bacteria and Streptococcus diacetilactis in a liquid medium comprising lactose, a proten source and a source of citric acid under aerobic growth conditions at temperatures between 20–45° C. for at least one day, killing the said organisms in the mixture and thereafter combining said mixture with a food material to impart a cream cheese type flavor.
2. A process according to claim 1 wherein the lactic acid producting bacteria are *Streptococcus lactis.*
3. A process according to claim 1 wherein the lactose and protein source are present as milk or a milk fraction.
4. A process according to claim 3 wherein the lactic acid producing bacteria or *Streptococcus lactis.*
5. A process according to claim 3 wherein the lactose and protein source is skim milk.
6. A process according to claim 5 including the additional step of drying the product to form a powder having a long shelf life.
7. A process according to claim 6 wherein the lactic acid producing bacteria are *Streptococcus lactis.*
8. A process according to claim 1 including the additional step of drying the product to form a powder.
9. A process according to claim 3 wherein the lactose and protein source is whey.
10. A process according to claim 3 wherein the lactose and protein source is whole milk.
11. A process for producing a strong cream cheese flavor comprising growing a mixture of organisms consisting essentially of at least one Streptococcus or Lactobacillus lactic acid producing bacteria and Streptococcus diacetilactis in a liquid medium consisting essentially of milk or skim milk and a source of citric acid under aerobic growth conditions at temperatures between 20–45° C.

for at least one day, killing the said organisms in the mixture and thereafter combining said mixture with a food material to impart a cream cheese type flavor.

References Cited

UNITED STATES PATENTS

| | | | |
|---|---|---|---|
| 3,048,490 | 8/1962 | Lundstedt | 99—116 |
| 3,100,153 | 8/1963 | Knight | 99—116 |
| 3,420,742 | 1/1969 | Farr | 99—116 X |

OTHER REFERENCES

Sanders, G. P., Cheese Varieties and Descriptions, 1953, U.S. Dept. of Agriculture Handbook No. 54, page 36.

LIONEL M. SHAPIRO, Primary Examiner

D. M. NAFF, Assistant Examiner

U.S. Cl. X.R.

99—59, 140

UNITED STATES PATENT OFFICE
CERTIFICATE OF CORRECTION

Patent No. 3,535,121            Dated October 20, 1970

Inventor(s) Anthony J. Luksas

It is certified that error appears in the above-identified patent and that said Letters Patent are hereby corrected as shown below:

Column 1, line 37, change "browing" to --growing--.
Column 2, line 5, change "unsing" to --using--.
Column 2, line 36, change "proten" to --protein--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents

FORM PO-1050 (10-69)